United States Patent
Endo

(10) Patent No.: US 9,313,524 B2
(45) Date of Patent: Apr. 12, 2016

(54) MOVING IMAGE CODING APPARATUS, MOVING IMAGE CODING METHOD, AND PROGRAM THEREFOR

(71) Applicant: CANON KABUSHIKI KAISHA, Tokyo (JP)

(72) Inventor: Hiroaki Endo, Hachioji (JP)

(73) Assignee: CANON KABUSHIKI KAISHA, Tokyo (JP)

(\*) Notice: Subject to any disclaimer, the term of this patent is extended or adjusted under 35 U.S.C. 154(b) by 284 days.

(21) Appl. No.: 14/051,799

(22) Filed: Oct. 11, 2013

(65) Prior Publication Data

US 2014/0119449 A1     May 1, 2014

(51) Int. Cl.
*H04N 19/593*     (2014.01)
*H04N 19/11*     (2014.01)

(52) U.S. Cl.
CPC ............................. *H04N 19/593* (2014.11)

(58) Field of Classification Search
CPC ...... H04N 19/593; H04N 19/11; H04N 19/61; H04N 19/14; H04N 19/159
USPC ................................................ 375/240.16
See application file for complete search history.

(56) References Cited

U.S. PATENT DOCUMENTS

| | | | | |
|---|---|---|---|---|
| 2006/0279654 | A1* | 12/2006 | Lee | H04N 19/105 348/395.1 |
| 2010/0020872 | A1* | 1/2010 | Shimizu | H04N 19/196 375/240.12 |
| 2011/0211636 | A1* | 9/2011 | Yamada | H03M 7/4006 375/240.12 |

FOREIGN PATENT DOCUMENTS

JP     2011-176407 A     9/2011

\* cited by examiner

*Primary Examiner* — William C Vaughn, Jr.
*Assistant Examiner* — Jae N Noh
(74) *Attorney, Agent, or Firm* — Carter, DeLuca, Farrell & Schmidt, LLP

(57) ABSTRACT

A moving image coding apparatus which acquires moving image data represented by one of a plurality of different bit depths, converts the acquired moving image data to moving image data having the lowest bit depth among the plurality of different bit depths, determines a prediction mode relating to intra-picture prediction on the basis of the moving image data of the converted bit depth, and prediction-codes the acquired moving image data represented by one of the plurality of different bit depths in accordance with the determined prediction mode.

14 Claims, 7 Drawing Sheets

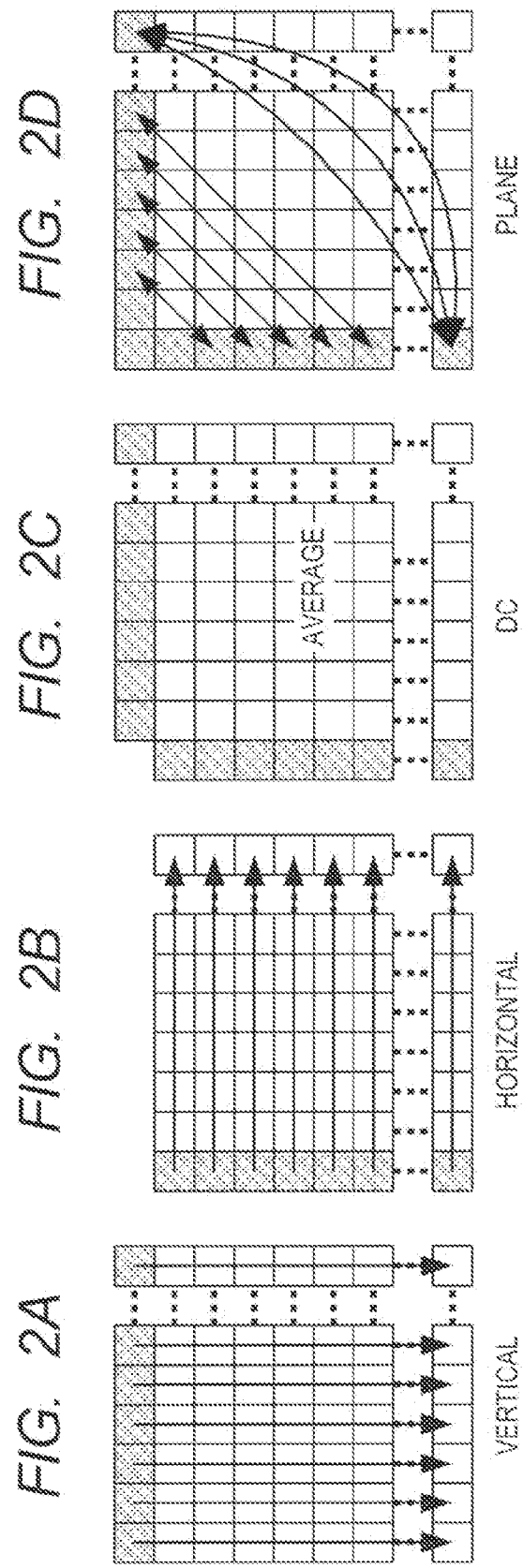

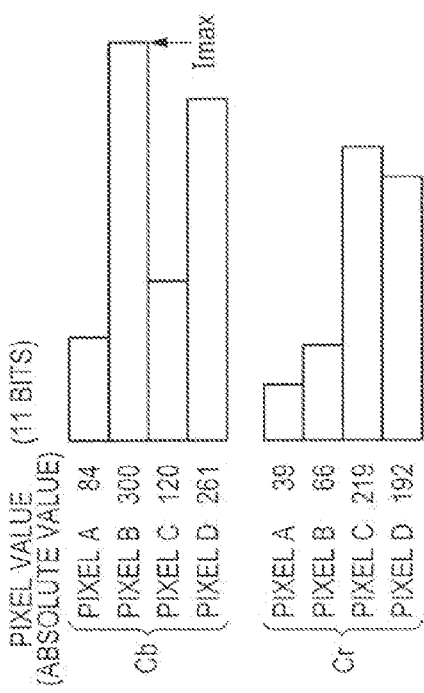
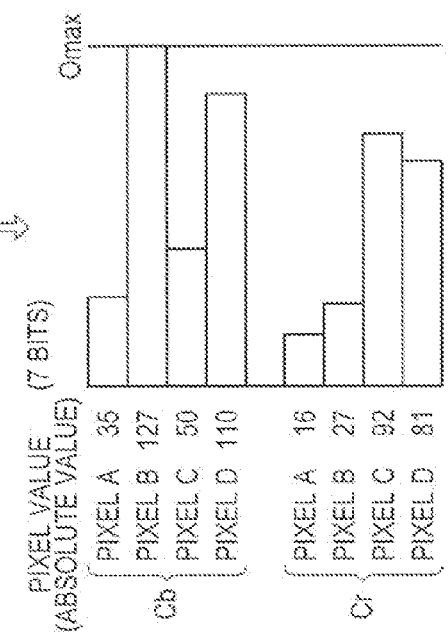
FIG. 4A
FIG. 4B
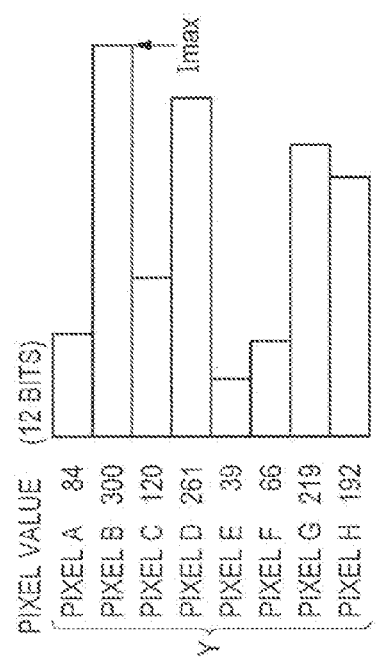
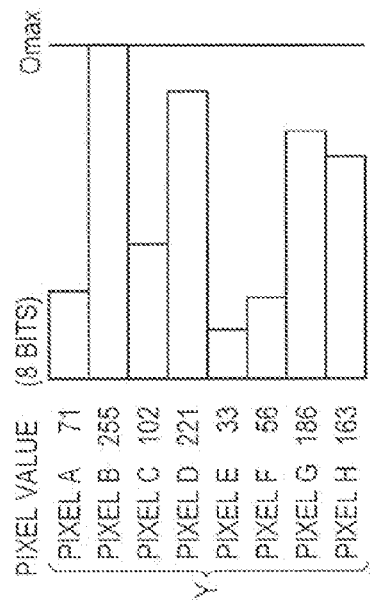

MOVING IMAGE CODING APPARATUS, MOVING IMAGE CODING METHOD, AND PROGRAM THEREFOR

BACKGROUND OF THE INVENTION

1. Field of the Invention

The present invention relates to a moving image coding apparatus for coding a moving image, in particular, a moving image coding apparatus for coding moving image data having different bit depths including a high bit depth.

2. Description of the Related Art

In recent years, information relating to so-called multimedia, such as an audio signal and an image signal, has been digitalized radically. In response to the digitalization of the information, compression coding/decoding techniques for image data have attracted attention. A storage capacity required for storing the image data and a frequency band required for transmitting the image data can be reduced by the compression coding/decoding techniques. Therefore, the compression coding/decoding techniques are significantly important in the multimedia industry.

The compression coding/decoding techniques compress information amount/data amount by using a high autocorrelation (that is, a high redundancy) existing between a large number of images. The redundancy of the image data includes a temporal redundancy and a two-dimensional spatial redundancy. The temporal redundancy can be reduced by using motion detection and motion compensation on a block basis. On the other hand, the spatial redundancy can be reduced by discrete cosine transform (DCT). As an image coding method using the above-mentioned techniques, there exists an H.264/MPEG-4 PART 10 (AVC) (hereinafter referred to as "H.264").

In the field of movie production as represented by digital cinema, expectations for hyper high quality images have been raised. Therefore, studies of highly raising image quality of video images are energetically made. As one of elements for the highly raising image quality, there is an increase in a dynamic range of the video image. Specifically, a bit depth of the image data is increased from the currently used 8 bits to 10 bits or 12 bits. The highly increasing bit depth of the image data readily results in increase in the data amount of the images. Therefore, studies on an efficient coding method are now being made. For example, in Japanese Patent Application Laid-Open No. 2011-176407, input-image data is subjected to conversion processing so as to reduce a bit depth of the input image data. Then, the image data after the conversion processing is coded, while difference information between a coded image after the conversion processing and the input image having the high bit depth is also coded.

In Japanese Patent Application Laid-Open No. 2011-176407 cited above, however, the coded image data is required to be decoded so as to calculate the difference information between the coded image having a low bit depth and the input image having the high bit depth. As a result, computation cost for coding processing is disadvantageously increased. Moreover, in the H.264 described above, a conventional coding method for an 8-bit depth is directly used to deal with the highly increasing bit depth of the image data. However, the coding method for the 8-bit depth is directly used, and thus, the data amount is readily increased. Therefore, even in this case, the computation cost for the coding processing disadvantageously increases.

SUMMARY OF THE INVENTION

In view of the above-mentioned problem of the related art, the present invention provides a moving image coding apparatus compatible with coding of image data having a high bit depth while suppressing an increase in computation cost for coding processing without greatly lowering accuracy of selection of an intra-prediction method.

In order to solve the problem described above, the moving image coding apparatus according to the present invention acquires moving image data represented by one of a plurality of different bit depths, converts the acquired moving image data to moving image data having the lowest bit depth among a plurality of different bit depths, determines a prediction mode relating to intra-picture prediction based on the moving image data whose bit depth is converted, and prediction-codes the acquired moving image data represented by one of the plurality of bit depths in accordance with the determined prediction mode. An image signal having an Ni-bit depth is intra-prediction coded in accordance with the determined intra-prediction mode.

For a plurality of color difference components, common bit depth conversion processing is performed.

Further features of the present invention will become apparent from the following description of exemplary embodiments with reference to the attached drawings.

BRIEF DESCRIPTION OF THE DRAWINGS

FIGS. 2A, 2B, 2C, and 2D are diagrams for illustrating prediction modes of intra-prediction.

FIGS. 4A and 4B are diagrams for illustrating a second modification of the conversion processing by the bit depth conversion unit according to the first embodiment of the present invention.

DESCRIPTION OF THE EMBODIMENTS

Hereinafter, exemplary embodiments of the present invention are described in detail referring to the accompanying drawings.

First Embodiment

Figure 1:
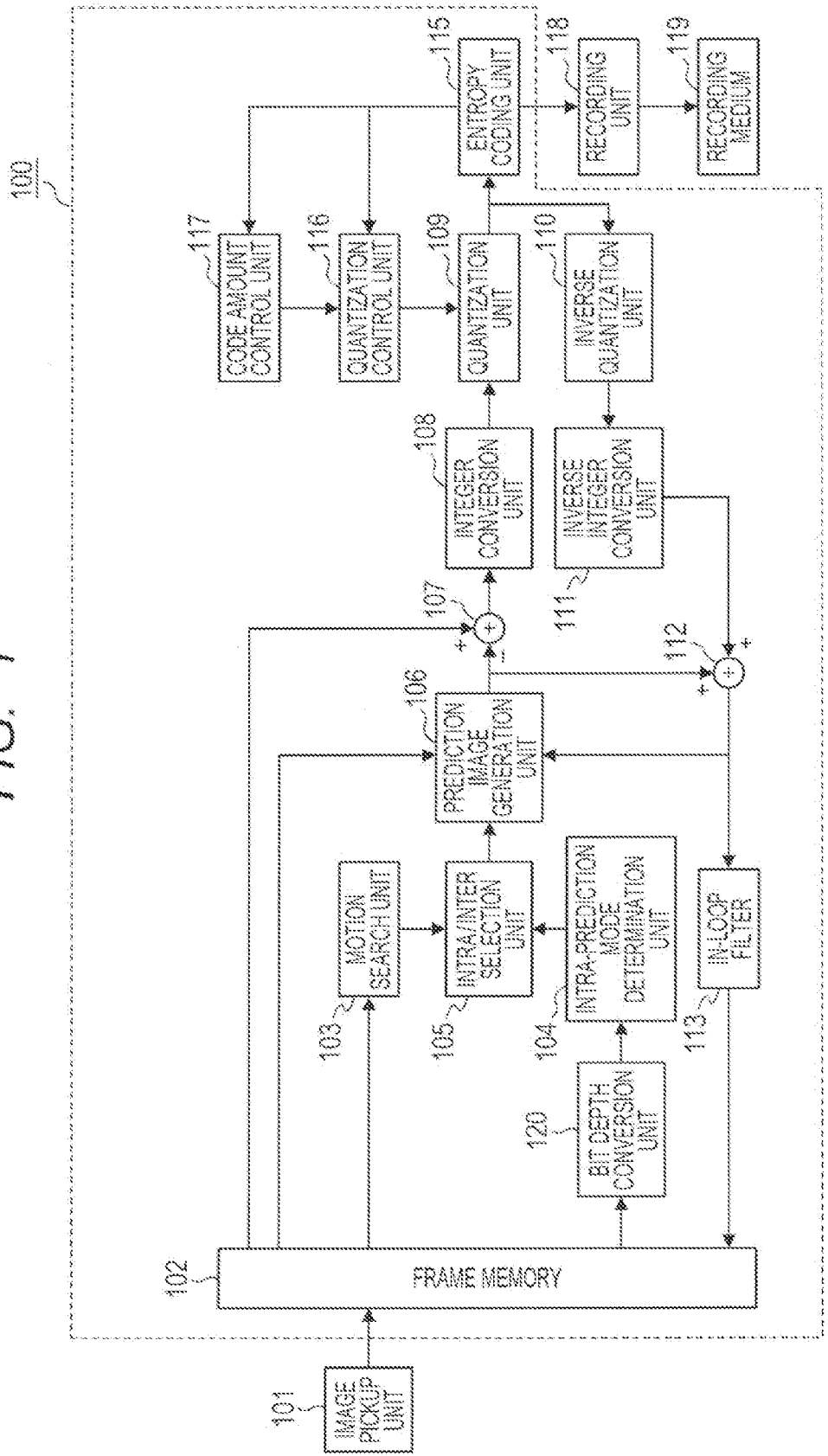
FIG. 1 is a block diagram illustrating a configuration example of a moving image coding apparatus according to a first embodiment of the present invention.

FIG. 1 is a block diagram illustrating a configuration example of a moving image coding apparatus for prediction-coding a moving image according to a first embodiment of the present invention.

In FIG. 1, a moving image coding apparatus 100 acquires input moving image data from an image pickup unit 101 including a camera unit having a lens and an image pickup sensor. The moving image coding apparatus 100 includes a frame memory 102, a motion search unit 103, an intra-prediction mode determination unit 104, a bit depth conversion unit 120, an intra/inter selection unit 105, a prediction image generation unit 106, a subtracter 107, an integer conversion unit 108, a quantization unit 109, an inverse quantization unit 110, an inverse integer conversion unit 111, an adder 112, an in-loop filter 113, an entropy coding unit 115, a quantization control unit 116, and a code amount control unit 117. The motion search unit 103 searches for a motion vector. The intra-prediction mode determination unit 104 determines an intra-prediction method. The bit depth conversion unit 120 converts a bit depth of a pixel value. The intra/inter selection unit 105 selects any one prediction method from inter-prediction and intra-prediction. Coded data generated by compression coding performed by the moving image coding apparatus 100 is recorded on a recording medium 119 by a recording unit 118. The inter-prediction is also referred to as "inter-picture prediction", whereas the intra-prediction is also referred to as "intra-picture prediction".

The moving image coding apparatus 100 is configured so that the recording medium 119 can be attached thereto. The moving image coding apparatus 100 according to the present embodiment has the configuration described above. Therefore, the moving image coding apparatus 100 according to the present embodiment is applicable not only to an image processing apparatus included in an image pickup apparatus having an image pickup unit and a recording unit but also to an information processing apparatus such as a PC having a signal input unit and a recording unit. In this case, the moving image coding apparatus is controlled by a CPU included in a control unit of the imaging apparatus or the information processing apparatus. Specifically, an operation of each of the units of the moving image coding apparatus according to the present embodiment is realized by the execution of a control program by the CPU.

The moving image coding apparatus according to the present embodiment acquires moving image data obtained by image pickup by the image pickup unit 101 and sequentially stores the acquired moving image data in a region for input images in the frame memory 102. The moving image coding apparatus 100 according to the present embodiment has a configuration capable of inputting moving image data having different bit depths and compression-coding the input moving image data. For example, the respective units including the frame memory 102 are configured so as to be capable of inputting the moving image data having any of bit depths such as 12 bits, 10 bits, and 8 bits and compression-coding the input moving image data. In the present embodiment, it is assumed that the moving image data to be input has an Ni-bit depth, which is stored in the frame memory 102. The bit depth Ni indicates any of a plurality of bit depths (for example, 12 bits, 10 bits, and 8 bits). The bit depth of the moving image data to be stored in the frame memory 102 may be selected by a user or may be fixed. Alternatively, the bit depth may correspond to the discriminated bit depth of the input moving image data. The present embodiment is described hereinafter assuming Ni=12.

The motion search unit 103 reads out, from the frame memory 102, image data of a coding-subject block and image data in a motion search range of a reference frame. By a block matching method between the image data present in the search range and the image data of the coding-subject block, a portion of the image data present in the search range, which has a high correlation, is determined as a motion vector. The motion vector is output together with an evaluation value which is based on the correlation, to the intra/inter selection unit 105.

In an intra-prediction mode (intra-picture prediction mode), a plurality of prediction modes, for example, illustrated in FIGS. 2A to 2D are selectable. In FIGS. 2A to 2D, a rectangle represents one pixel. An outlined rectangle represents a pixel in the coding-subject block, whereas a filled rectangle represents a peripheral pixel for the coding-subject block. As a prediction image in the intra-prediction modes illustrated in FIGS. 2A to 2D, pixels in the periphery of the block are used to generate a prediction image having pixel values of the pixels in the periphery in a direction indicated by the arrows. In vertical prediction illustrated in FIG. 2A, pixels adjacent upwardly are used to generate the prediction image. In horizontal prediction illustrated in FIG. 2B, pixels adjacent on the left are used to generate the prediction image. In DC prediction illustrated in FIG. 2C, an average value of the pixel values in the periphery is used as a pixel value of all the pixels of the prediction image. In plane prediction illustrated in FIG. 2D, the prediction image is generated by a computation using a plurality of adjacent pixel values. Note that the types of the intra-prediction modes are not limited to those described above.

The intra-prediction mode determination unit 104 is compatible with only moving image data having the lowest bit depth (hereinafter referred to as "No-bit depth") among the bit depths of moving image data with which the moving image coding apparatus 100 is compatible. In the present embodiment, it is assumed that the moving image coding apparatus 100 is compatible with 12 bits, 10 bits, and 8 bits. Hence, No=8.

The intra-prediction mode determination unit 104 reads out the image data of the coding-subject block, which is stored in the frame memory 102, as image data of a coding-subject block having an 8-bit depth, through the bit depth conversion unit 120 described later. Similarly, the intra-prediction mode determination unit 104 reads out the image data in the periphery of the coding-subject block, which is stored in the frame memory 102, as image data in the periphery of the coding-subject block having the 8-bit depth, through the bit depth conversion unit 120. The intra-prediction mode determination unit 104 uses the readout image data in the periphery to generate prediction images corresponding to the plurality of intra-prediction modes, and calculates, for the respective intra-prediction modes, the evaluation values each indicating the correlation with the coding-subject block. As the evaluation value, a sum of absolute differences between the pixel values of the coding-subject block and the prediction image. As the evaluation value becomes smaller, the correlation becomes higher. A method of calculating the evaluation value is not limited to that described above. The intra-prediction mode determination unit 104 outputs the intra-prediction mode corresponding to the minimum evaluation value among the calculated evaluation values of the respective intra-prediction modes to the intra/inter selection unit 105. The moving image data is composed of a luminance component and two color difference components (Cb and Cr). The intra-prediction mode determination unit 104 determines the intra-prediction mode for the luminance component and the intra-prediction mode common to the two color difference components for the color difference components.

The moving image data having the Ni–(Ni=12) bit depth, which is stored in the frame memory 102, is input to the bit depth conversion unit 120 which in turn outputs the image data having the No–(No=8) bit depth. The conversion of the bit depth is configured so that a reduction amount L of lower bits is calculated based on L=Ni–No (L=12–8=4) to delete lower L (L=4) bits from each pixel data. In a case where the bit depth of the input moving image data is No, the input moving image data is directly output without conversion. The conversion configuration is not limited to that described above, and may also be any of configurations described later as modifications of the present embodiment. With the configuration described above, even for a different bit depth of the moving image data to be coded, the intra-prediction mode can be determined by the single intra-prediction mode determination unit 104 (for all the different bit depths).

Figure 6:
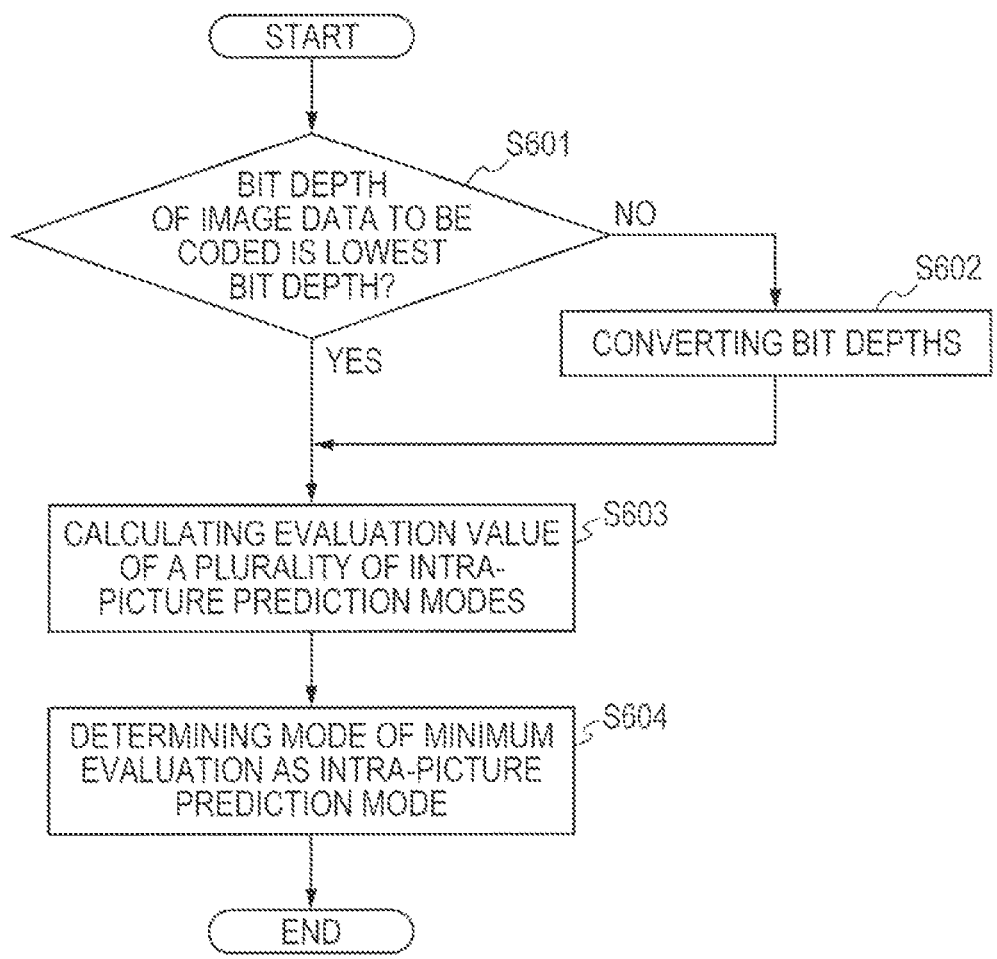
FIG. 6 is a flowchart illustrating an operation of the moving image coding apparatus according to the first embodiment of the present invention.

An operation of determining the intra-prediction mode, which is a feature of the present embodiment, is now described referring to FIG. 6. This operation is realized as software processing by the execution of a program by the CPU included in a control unit (not shown) of the moving image coding apparatus 100 according to the present embodiment or a control unit of the camera or the information processing apparatus to which the moving image coding apparatus is applied. Although not described in detail here, a coding operation after the determination of the intra-prediction mode can also be similarly realized as software processing performed by the CPU described above.

First, in Step S601, the bit depth conversion unit 120 determines whether or not the bit depth of the image data to be coded is the lowest bit depth among the bit depths of the moving image data with which the moving image coding apparatus 100 deals. In a case where the bit depth is not the lowest bit depth (the case of the present embodiment), bit depth conversion of the image data is performed in Step S602. Then, the operation proceeds to Step S603. When the bit depth is the lowest bit depth in Step S601, the operation proceeds to Step S603 without the bit depth conversion.

In Step S603, the intra-prediction mode determination unit 104 calculates the evaluation values of the plurality of intra-prediction modes. Then, the operation proceeds to Step S604. In Step S604, the intra-prediction mode determination unit 104 determines the mode providing a minimum evaluation value among the evaluation values of the plurality of intra-prediction modes as the intra-prediction mode.

The result from the motion search unit 103 and the result from the intra-prediction mode determination unit 104 are input to the intra/inter selection unit 105. The intra/inter selection unit 105 selects, for example, the prediction method having the smaller evaluation value and notifies the prediction image generation unit 106 of the selected prediction method. The prediction image generation unit 106 generates the prediction image in accordance with the input prediction method, and outputs the generated prediction image to the subtracter 107. In a case where the inter-prediction is selected, the prediction image is generated from the image data of the reference frame described below, which is stored in the frame memory 102. On the other hand, in a case where the intra-prediction is selected, the prediction image is generated from a reconfigured image output from the adder 112 described later. The subtracter 107 calculates a difference between the coding-subject image data and the prediction image data to generate difference image data. The difference image data is output to the integer conversion unit 108 where the input difference image data is subjected to integer conversion. The quantization unit 109 then performs quantization processing on the integer-converted difference image data.

The entropy coding unit 115 entropy-codes a conversion coefficient quantized by the quantization unit 109 and outputs the entropy-coded conversion coefficient as a stream to the recording unit 118. The quantization coefficient in the quantization unit 109 is calculated by the quantization control unit 116 based on a code amount generated in the entropy-coding unit 115 and a target code amount set by the code amount control unit 117. The recording unit 118 stores the stream output from the entropy coding unit 115 in the recording medium 119.

The conversion coefficient quantized by the quantization unit 109 is also input to the inverse quantization unit 110. The inverse quantization unit 110 inversely quantizes the input conversion coefficient and the inverse integer conversion unit 111 performs inverse integer conversion processing on the inverse-quantized signal.

The inverse integer converted data and the prediction image data generated by the prediction image generation unit 106 are input to the adder 112 to be added. Data obtained after the addition becomes decoded reconfigured image data, and is input to the prediction image generating unit 106 to be used for the generation of intra-prediction image data. The reconfigured image data is subjected to processing for reducing a coding distortion by the in-loop filter 113, and is then stored as image data of the reference frame to be used for inter-coding in a region (not shown) of the reference image in the frame memory 102.

According to the present embodiment described above, moving image coding compatible with coding of the image data having a high bit depth can be realized while suppressing the increase in computation cost for the coding processing without greatly lowering the accuracy of selection of the intra-prediction method. In particular, in contrast to the related art, the difference information between the coded image having the low bit depth and the input image having the high bit depth is not required to be calculated and coded. Therefore, a load of the coding processing and the data amount in coding can be prevented from being increased.

First Modification of the First Embodiment

A first modification of the operation of the bit depth conversion unit 120 (configuration of the bit depth conversion) according to the above-mentioned first embodiment of the present invention is now described. A configuration of the present modification is the same as that of the first embodiment described above except for a conversion operation of the bit depth conversion unit 120, and therefore the description thereof is herein omitted. The bit depths Ni and No are respectively 12 and 8 as in the case of the first embodiment. Moreover, as in the first embodiment, moving image data is composed of a luminance component and two color difference components. Hereinafter, the operation of the bit depth conversion unit 120 according to the present modification is described.

Figure 3B:
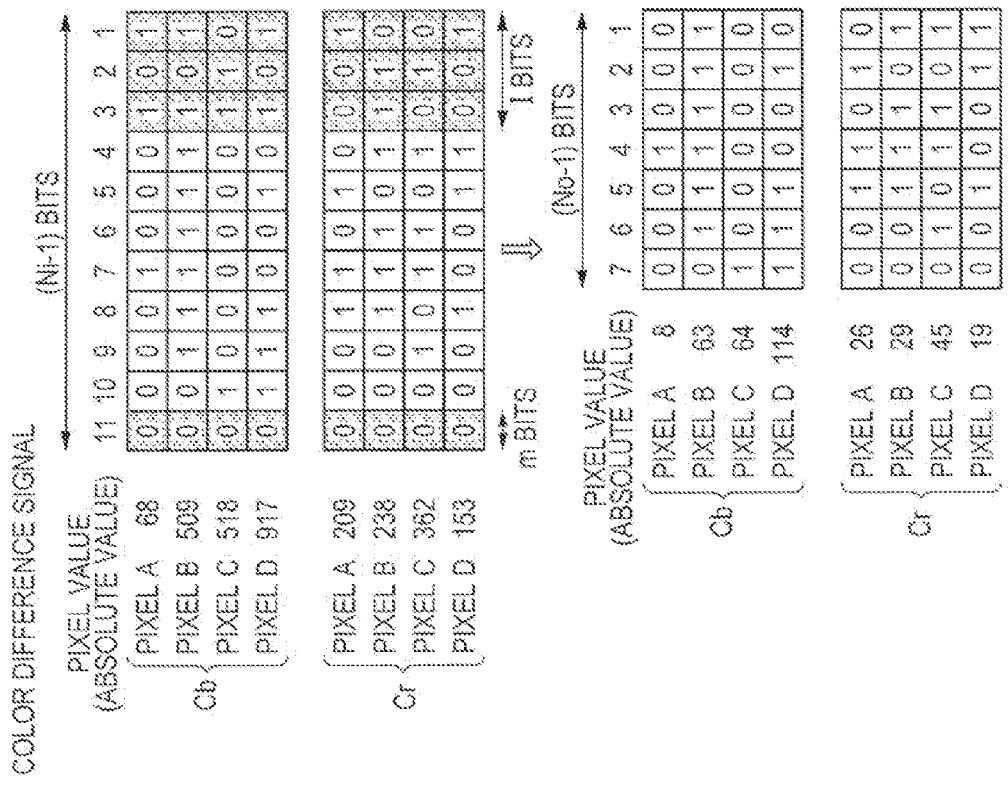
FIGS. 3A and 3B are diagrams for illustrating a first modification of conversion processing by a bit depth conversion unit according to the first embodiment of the present invention.
Figure 3A:
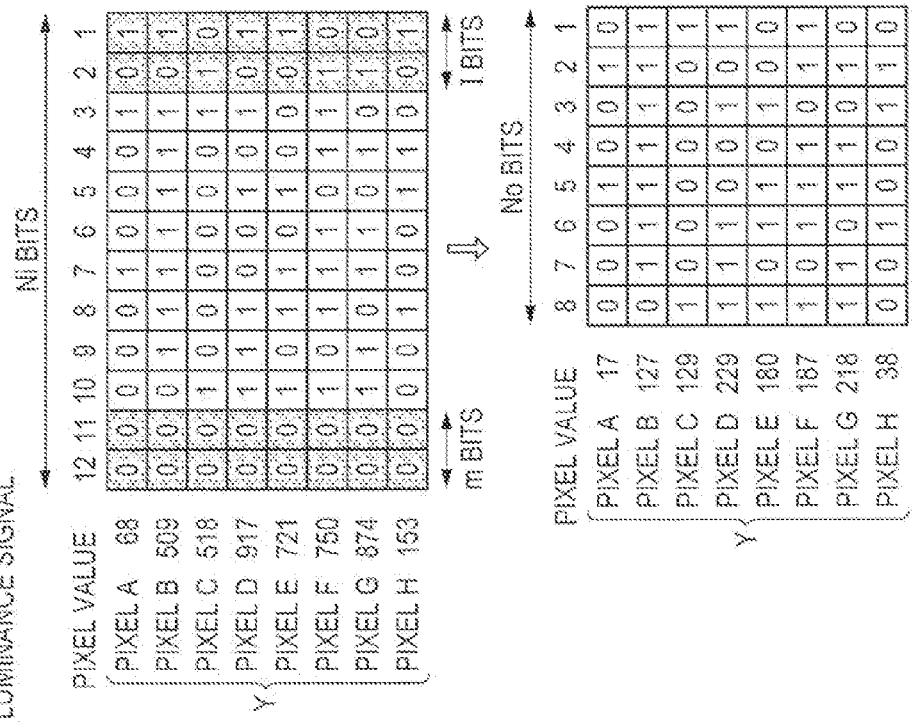

Image data of a coding-subject block and image data in the periphery thereof are input from moving image data having an Ni–(Ni=12) bit depth, which is stored in the frame memory 102, to the bit depth conversion unit 120. The bit depth conversion unit 120 detects a position n of an uppermost significant bit "1" in the entire pixel data of the luminance component of the input image data. In FIG. 3A, assuming that the input image data of the luminance component is composed of eight pixels from A to H, values of the respective pixels are exemplified as bit data. In this example, the position n of the uppermost significant bit "1" is 10. Therefore, a reduction amount m of upper bits is calculated by: m=Ni–n (m=12–10=2), whereas the reduction amount L of the lower bits is calculated by: L=Ni–No–m (L=12–8–2=2). The upper m bits and the lower L bits of each pixel of the luminance component of the input image data are deleted in accordance with the calculated reduction amounts m and L so that the image data is output as image data having the No-bit depth. For the color difference components, the same bit reduction as that performed for the luminance component is performed on the image data of the two color difference components so that the image data is output as image data having the No-bit depth (FIG. 3B). The color difference component has a value ranging from −2048 to +2047 in the case of the 12-bit depth. In this case, after −2048 is subjected to clipping processing to be −2047, an absolute value is obtained. After the same bit depth conversion is performed on the obtained absolute value, the original sign is given back thereto to obtain a value. In this case, the bit depth of the absolute value of the input color difference component is (Ni−1) bits, and the bit depth after the bit depth conversion is (No−1) bits. Moreover, the intra-prediction mode is common to the two color difference components, and thus the conversion of the bit depth is also performed commonly to the two color difference components.

By performing the bit reduction after the detection of the uppermost significant bit, the evaluation value with high accuracy can be calculated using the lower bits even when the pixel values are small as a whole.

According to the present modification, even in a case where the bit depth of the moving image data to be coded is different, the intra-prediction mode can be determined by the single intra-prediction mode determination unit 104 (for all the bit depths).

Second Modification of the First Embodiment

A second modification of the operation of the bit depth conversion unit 120 (configuration of the bit depth conversion) according to the above-mentioned first embodiment of the present invention is now described. A configuration of the present modification is also the same as that of the first embodiment described above except for a conversion operation of the bit depth conversion unit 120, and therefore the description thereof is herein omitted. Even in the present modification, the bit depths Ni and No are respectively 12 and 8 and the moving image data is composed of the luminance component and the two color difference components as in the first embodiment. Hereinafter, an operation of the bit depth conversion unit 120 according to this modification is described.

Image data of a coding subject block and image data in the periphery thereof from the moving image data having the N-bit depth (Ni=12), which is stored in the frame memory 102, are input to the bit depth conversion unit 120. A maximum pixel value Imax among the values of the pixels of the luminance component of the input image data is obtained. In FIG. 4A, assuming that the input pixel data of the luminance component is composed of 8 pixels, the values of the respective pixels are exemplified. In this example, the pixel having the maximum value is a pixel B and the maximum value Imax is 300. Assuming that a maximum value which can be represented by the bit depth of No (No=8) to be output is Omax (Omax=255), each luminance value is multiplied by (Omax/Imax) so as to be converted to a value having the bit depth of No. Then, the converted luminance value is output. For the color difference components, the same bit reduction as that performed for the luminance component is performed on the image data of the two color difference components, and then the result is output (FIG. 4B). In the case of the 12-bit depth, the color difference component has a value ranging from −2048 to +2047. In this case, after −2048 is subjected to clipping processing to be −2047, an absolute value thereof is obtained. After the same bit depth conversion is performed on the absolute value, the original sign is given back thereto to obtain a value. In this case, the bit depth of the absolute value of the input color difference component is (Ni−1) bits, whereas the bit depth after the bit depth conversion is (No−1) bits. Moreover, the intra-prediction mode is common to the two color difference components. Therefore, the conversion of the bit depth is performed commonly to the two color difference components.

By normalization with the maximum value of the pixel values, the evaluation value can be calculated with high accuracy efficiently using the range of the value that the bit depth after the conversion may have.

According to this modification, even when the bit depth of the moving image data to be coded is different, the intra-prediction mode can be determined by the single intra-prediction mode determination unit 104 (for all the bit depths).

Third Modification of the First Embodiment

A third modification of the operation of the bit depth conversion unit 120 (configuration of the bit depth conversion) according to the above-mentioned first embodiment of the present invention is now described. A configuration of the present modification is also the same as that of the first embodiment described above except for a conversion operation of the bit depth conversion unit 120, and therefore the description thereof is herein omitted. Even in the present modification, the bit depths Ni and No are respectively 12 and 8 and the moving image data is composed of the luminance component and the two color difference components as in the first embodiment. Hereinafter, an operation of the bit depth conversion unit 120 according to the present modification is described.

Image data of a coding subject block and image data in the periphery thereof from the moving image data having the N-bit depth (Ni=12), which is stored in the frame memory 102, are input to the bit depth conversion unit 120. The bit depth conversion unit 120 converts the input image data having the N-bit depth to image data having the No-bit depth by a computation in accordance with the following conversion formula:

$$P_{out} = 4 \times \sqrt{P_{in}}$$

where Pin is a pixel value before the conversion and Pout is a pixel value after the conversion.

In accordance with the aforementioned formula, the bit depth conversion unit 120 converts each luminance value, and outputs the result of conversion. For the color difference components, the bit reduction is performed on the image data of the two color difference components as in the case of the luminance component. Then, the result is output. In the case of the 12-bit depth, the color difference component has a value ranging from −2048 to +2047. After the same bit depth conversion is performed by using the absolute value thereof, the original sign is given back thereto to obtain a value. In this case, a conversion formula for obtaining the absolute value is $|P_{out}| = 2 \times \sqrt{2} \times \sqrt{|P_{in}|}$. The intra-prediction mode is common to the two color difference components. Thus, the conversion of the bit depth is performed commonly to the two color difference components. The conversion formulae are not limited to those described in the present modification.

The evaluation value can be calculated with high accuracy, taking advantage of the region where the pixel value is small although the common conversion processing is performed regardless of the magnitude of the pixel values as a whole. For some conversion formulae, importance can also be placed on a region where the pixel value is large. Alternatively, importance may also be placed on a region where the pixel value is approximately intermediate.

According to the present modification, even in a case where the bit depth of the moving image data to be coded is different, the intra-prediction mode can be determined by the single intra-prediction mode determination unit 104 (for all the bit depths).

Second Embodiment

Figure 5:
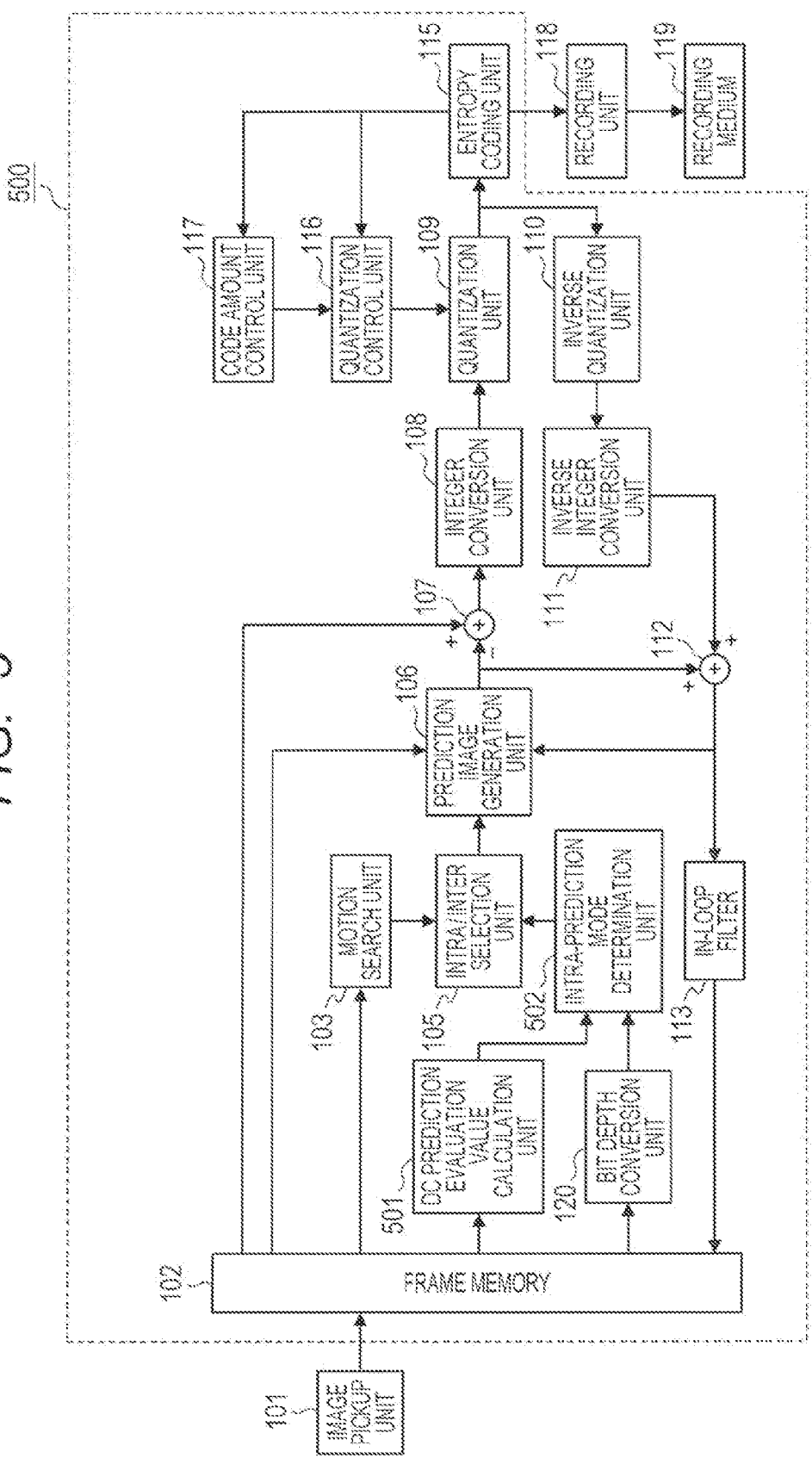
FIG. 5 is a block diagram illustrating a configuration example of a moving image coding apparatus according to a second embodiment of the present invention.

A second embodiment of the present invention is described referring to FIG. 5.

FIG. 5 is a block diagram illustrating a configuration example of a moving image coding apparatus 500 according to the present embodiment. In FIG. 5, the second embodiment is the same as the first embodiment except for a DC prediction evaluation value calculation unit 501 and an intra-prediction mode determination unit 502. Therefore, the description thereof is herein omitted. Even in the second embodiment, it is assumed that Ni and No are respectively 12 and 8.

The DC prediction evaluation value calculation unit 501 uses input image data, that is, image data having the N-bit depth which is the same as that of the image data to be coded as an input to calculate an evaluation value of DC prediction in the intra-prediction mode. The DC prediction evaluation value calculation unit 501 reads out the image data of the coding-subject block and the image data in the periphery of the coding-subject block from the moving image data having the 12-bit depth, which is stored in the frame memory 102. Then, by using the readout image data in the periphery, a prediction image corresponding to the DC prediction mode is generated. An evaluation value indicating the correlation with the coding-subject block is calculated, and is then output to the intra-prediction mode determination unit 502.

Similarly to the intra-prediction mode determination unit 104 described in the first embodiment above, the intra-prediction mode determination unit 502 calculates evaluation values corresponding to the intra-prediction modes other than the DC prediction mode. At this time, the evaluation value of the DC prediction mode, which is input from the DC prediction evaluation value calculation unit 501 is divided by 16 ($2^4$) to be corrected so as to correspond to the evaluation value of the image data having the bit depth of No. The intra-prediction mode determination unit 502 compares the corrected evaluation value of the DC prediction mode and each of the calculated evaluation values of the other intra-prediction modes, and outputs the intra-prediction mode having a minimum evaluation value to the intra/inter selection unit 105.

Alternatively, the intra-prediction mode determination unit 502 may determine the intra-prediction mode in the following manner. Specifically, the intra-prediction mode determination unit 502 determines whether or not the evaluation value of the DC prediction mode before the correction is smaller than a threshold value. In a case where the evaluation value of the DC prediction mode is smaller than the threshold value, the DC prediction mode is determined as the intra-prediction mode without the comparison with the evaluation values of the other intra-prediction modes.

The DC prediction mode is frequently used mainly for a flat image portion. In the flat image portion, the expression of a slight contrast of an image provides visually high image quality. From this fact, in a case where the evaluation value of the DC prediction mode is calculated with the N-bit depth as in the present embodiment, the accuracy of selection of the DC prediction mode is improved to prevent visual image degradation in the flat portion.

Figure 7:
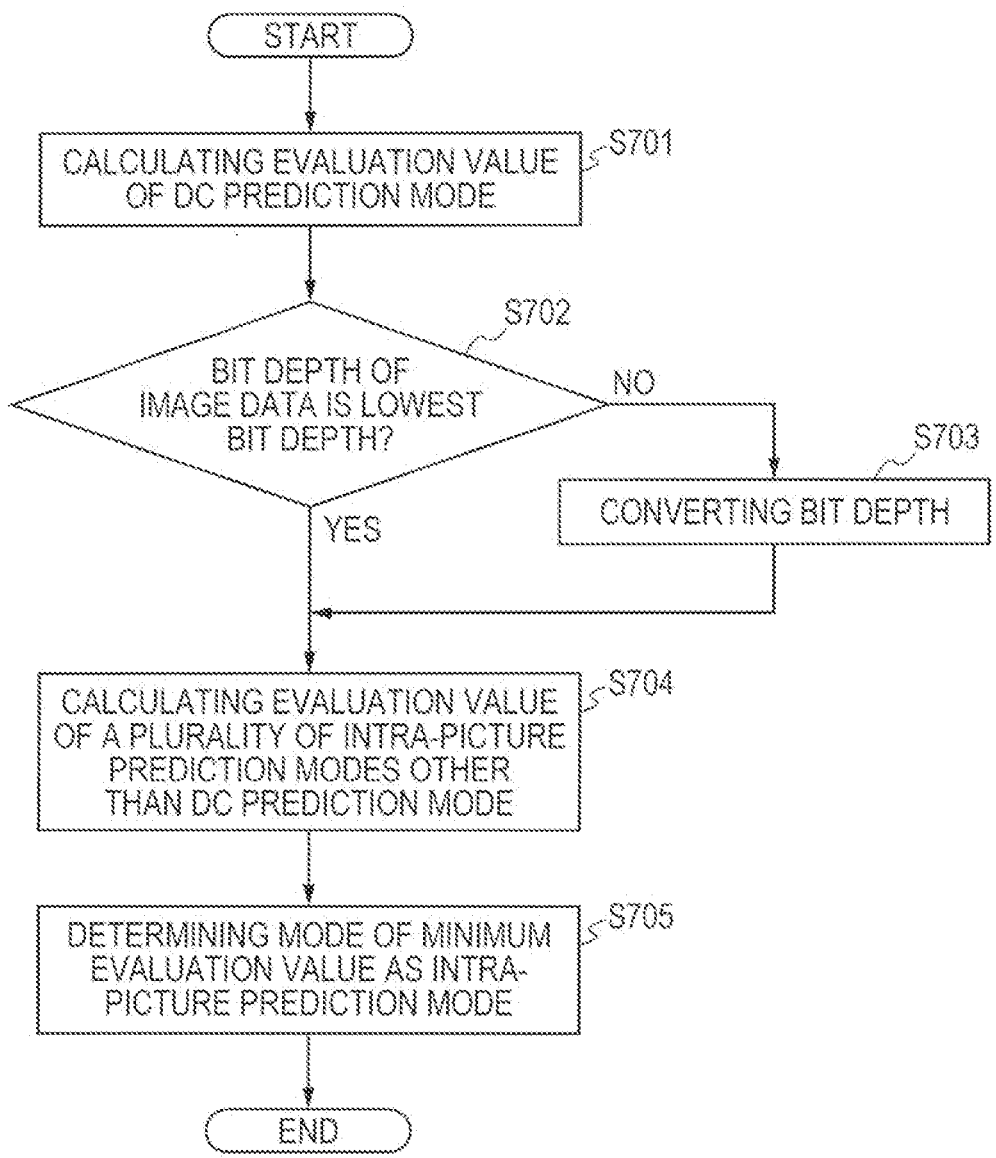
FIG. 7 is a flowchart illustrating an operation of the moving image coding apparatus according to the second embodiment of the present invention.

An operation of determining the intra-prediction mode, which is a feature of the second embodiment, is now described referring to FIG. 7. This operation is realized as software processing by the execution of the program by a CPU of a control unit (not shown) of the moving image coding apparatus 500 of the present embodiment or a control unit of the camera or the information processing apparatus to which the moving image coding apparatus of the present embodiment is applied. Although not described herein in detail, a coding operation after the determination of the intra-prediction mode can also be similarly realized as the software processing performed by the CPU.

First, in Step S701, the DC prediction evaluation value calculation unit 501 calculates the evaluation value of the DC prediction mode.

In Step S702, the bit depth conversion unit 120 determines whether or not the bit depth of the image data to be coded is the lowest bit depth among the bit depths of the moving image data with which the moving image coding apparatus 500 deals. In a case where the bit depth is not the lowest bit depth (the case of the present embodiment), the bit depth conversion of the image data is performed in Step S703. Then, the operation proceeds to Step S704. In a case where the bit depth is the lowest bit depth in Step S702, the operation proceeds to Step S704 without the bit depth conversion.

In Step S704, the intra-prediction mode determination unit 502 calculates the evaluation values of the plurality of intra-prediction modes other than the DC prediction mode. Then, the operation proceeds to Step S705. In Step S705, after correcting the evaluation value of the DC prediction mode so that the evaluation value of the DC prediction mode can be compared with the evaluation values of the other modes, the intra-prediction mode determination unit 502 determines the mode providing the minimum evaluation value among the evaluation values of the plurality of intra-prediction modes including the DC prediction mode as the intra-prediction mode.

According to the present embodiment, the moving image coding which can deal with the coding of the image data having the high bit depth can also be realized while suppressing the increase in the computation cost for the coding processing without greatly lowering the accuracy of selection of the intra-prediction method.

Other Embodiments

Each of the units constituting the moving image coding apparatus and each of the steps of the moving image coding methods according to the above-mentioned embodiments of the present invention can be realized by the operation of the program stored in a RAM or a ROM of a computer. The program and the computer-readable recording medium which stores the program are encompassed in the present invention.

Moreover, the present invention can also be embodied, for example, as a system, an apparatus, a method, a program, or a recording medium. Specifically, the present invention may be applied to a system including a plurality of devices or to an apparatus including a single device.

The present invention includes the case where software programs for realizing the functions of the embodiments described above (programs corresponding to the illustrated flowchart) are supplied to the system or the apparatus directly or from a remote place. Further, the present invention also includes the case where the present invention is achieved by reading out the supplied program codes by a computer of the system or the apparatus to execute the programs.

Thus, the program codes installed in the computer to realize the functions and processing of the present invention by the computer also realize the present invention. In other words, the present invention also includes the computer programs to realize the functions and processing of the present invention. In this case, as long as program functions are provided, any types of programs such as object codes, programs executed by an interpreter, and script data supplied to the OS may be employed.

Examples of a recording medium for supplying programs include a flexible disk, a hard disk, an optical disk, a magneto-optical disk, an MO, a CD-ROM, a CD-R, a CD-RW, a magnetic tape, a nonvolatile memory card, a ROM, and a DVD (DVD-ROM or DVD-R).

Alternatively, the program may be supplied by connection with a home page of the Internet by using a browser of a client computer. Then, the computer program of the present invention or a compressed file including an automatic installation function may be downloaded from the home page onto a recording medium such as a hard disk.

The functions can be realized by dividing program codes of the program of the present invention into a plurality of files and downloading the files from different home pages. In other words, a WWW server that enables a plurality of users to download program files for realizing the functions and processing of the present invention by the computer is also included in the present invention.

Yet alternatively, the programs of the present invention may be encrypted to be stored on a recording medium such as a CD-ROM, and distributed to the users. In this case, only users who satisfy predetermined conditions may be permitted to download key information for decrypting the programs from a home page via the Internet, and decrypt the encrypted programs by the key information to execute the programs, thereby installing the programs in the computers.

The computer may execute the read programs to realize the functions of the embodiments described above. Further, based on instructions of the programs, the OS operating on the computer may carry out a part or all of actual processing to realize the functions of the embodiments described above.

Still alternatively, the programs read from the recording medium may be written in a memory disposed in a function expansion board inserted into the computer or a function expansion unit connected to the computer. Then, based on instructions of the programs, a CPU disposed in the function expansion board or the function expansion unit may carry out a part or all of actual processing to realize the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-238002, filed on Oct. 29, 2012, which is hereby incorporated by reference herein in its entirety.

What is claimed is:

1. A moving image coding apparatus for prediction-coding input moving image data by using at least intra-picture prediction, the moving image coding apparatus being arranged to deal with moving image data having a plurality of different bit depths, the moving image coding apparatus comprising:

an acquisition unit configured to acquire moving image data represented by at least one of the plurality of different bit depths;

a conversion unit configured to convert the moving image data acquired by the acquisition unit to moving image data having a lowest bit depth among the plurality of different bit depths;

a determination unit configured to determine a prediction mode relating to the intra-picture prediction on the basis of the moving image data of the bit depth converted by the conversion unit; and a coding unit configured to prediction-code the moving image data represented by the one of the plurality of different bit depths, which is acquired by the acquisition unit, in accordance with the prediction mode determined by the determination unit, wherein the determination unit determines the prediction mode of the moving image data represented by the lowest bit depth on the basis of evaluation values of a plurality of prediction modes, and wherein in a case where the bit depth of the moving image data acquired by the acquisition unit is the lowest bit depth, the conversion unit outputs the acquired moving image data.

2. The moving image coding apparatus according to claim 1, wherein the determination unit corrects an evaluation value of a predetermined mode among the plurality of prediction modes to an evaluation value of the lowest bit depth, where the evaluation value of the predetermined mode being computed from the moving image data represented by the one of the plurality of different bit depths acquired by the acquisition unit, computes the evaluation values of the plurality of prediction modes other than the predetermined mode from the moving image data output from the conversion unit, and determines an intra-picture prediction mode on the basis of the corrected evaluation value and an evaluation value computed from the moving image data output from the conversion unit.

3. The moving image coding apparatus according to claim 2, wherein, in a case where the evaluation value of the predetermined mode, which is computed from the moving image data represented by the one of the plurality of different bit depths, is smaller than a predetermined threshold value, the determination unit determines the predetermined mode as a prediction mode.

4. The moving image coding apparatus according to claim 3, wherein the predetermined mode is a DC prediction mode.

5. The moving image coding apparatus according to claim 1, wherein, in a case where the bit depth of the moving image data acquired by the acquisition unit is Ni and the lowest bit depth is No, the conversion unit deletes lower L (L=Ni−No) bits of the moving image data acquired by the acquisition unit to convert the bit depth of the moving data acquired by the acquisition unit.

6. The moving image coding apparatus according to claim 1, wherein, in a case where the bit depth of the moving image data acquired by the acquisition unit is Ni and the lowest bit depth is No, the conversion unit detects a position n of an uppermost significant bit of the moving image data acquired by the acquisition unit and deletes upper m (m=Ni−n) bits and lower L (L=Ni−No−m) bits of the moving image data acquired by the acquisition unit on a basis of the detected position n to convert the bit depth of the moving image data acquired by the acquisition unit.

7. The moving image coding apparatus according to claim 1, wherein, in a case where the bit depth of the moving image data acquired by the acquisition unit is Ni and the lowest bit depth is No, the conversion unit detects a largest pixel value Imax of the moving image data acquired by the acquisition unit and multiplies the moving image data acquired by the acquisition unit by (Omax/Imax) to convert the bit depth of the moving image data acquired by the acquisition unit where a maximum pixel value, which can be represented by the bit depth of No, is the Omax.

8. The moving image coding apparatus according to claim 1, wherein the conversion unit converts the bit depth of the moving image data acquired by the acquisition unit by a computation in accordance with a conversion formula.

9. The moving image coding apparatus according to claim 1, wherein the conversion unit performs common bit depth conversion for a plurality of color difference components of the moving image data acquired by the acquisition unit.

10. The moving image coding apparatus according to claim 1, further comprising a motion search unit for searching for a motion vector of the moving image data acquired by the acquisition unit,
wherein the coding unit prediction-codes the moving image data acquired by the acquisition unit on the basis of a result of the search for the motion vector by the motion search unit and a result of the determination of the prediction mode by the determination unit.

11. A moving image coding method for prediction-coding input moving image data by using at least intra-picture prediction, the moving image coding method being arranged to deal with moving image data having a plurality of different bit depths,
the moving image coding method comprising:
acquiring and storing in a memory moving image data represented by at least any one of the plurality of different bit depths;
converting the moving image data stored in the memory to moving image data having a lowest bit depth among the plurality of different bit depths;
determining a prediction mode relating to the intra-picture prediction based on the moving image data of the bit depth converted in the converting; and
prediction-coding the moving image data represented by the one of the plurality of different bit depths, which is stored in the memory in the acquiring, in accordance with the prediction mode determined in the determining
wherein in the determining, the prediction mode of the moving image data represented by the lowest bit depth is determined on the basis of evaluation values of a plurality of prediction modes, and
wherein in the converting, in a case where the bit depth of the moving image data acquired in the acquiring is the lowest bit depth, the acquired moving image data is outputted.

12. A computer-readable non-transitory recording medium having stored thereon a program for controlling a computer to execute the moving image coding method for prediction-coding input moving image data by using at least intra-picture prediction, the moving image coding method being arranged to deal with moving image data having a plurality of different bit depths, the moving image coding method comprising:
acquiring and storing in a memory moving image data represented by at least any one of the plurality of different bit depths;
converting the moving image data stored in the memory to moving image data having a lowest bit depth among the plurality of different bit depths;
determining a prediction mode relating to the intra-picture prediction based on the moving image data of the bit depth converted in the converting; and
prediction-coding the moving image data represented by the one of the plurality of different bit depths, which is stored in the memory in the acquiring, in accordance with the prediction mode determined in the determining,
wherein in the determining, the prediction mode of the moving image data represented by the lowest bit depth is determined on the basis of evaluation values of a plurality of prediction modes, and
wherein in the converting, in a case where the bit depth of the moving image data acquired in the acquiring is the lowest bit depth, the acquired moving image data is outputted.

13. The moving image coding apparatus according to claim 1, wherein the acquisition unit acquires the moving image data output from an image pickup unit.

14. The moving image coding apparatus according to claim 1, wherein the coding unit further encodes the moving image data acquired by the acquisition unit using an inter-picture prediction coding.

* * * * *